United States Patent [19]

Kawanabe

[11] Patent Number: 4,641,258
[45] Date of Patent: Feb. 3, 1987

[54] ELECTRONIC COMPUTER WITH AURAL OUTPUT

[75] Inventor: Tsuyoshi Kawanabe, Yokohama, Japan

[73] Assignee: Canon Kabushiki Kaisha, Tokyo, Japan

[21] Appl. No.: 781,321

[22] Filed: Sep. 30, 1985

Related U.S. Application Data

[63] Continuation of Ser. No. 639,622, Aug. 9, 1984, abandoned, which is a continuation of Ser. No. 442,902, Nov. 19, 1982, abandoned, which is a continuation of Ser. No. 197,592, Oct. 16, 1980, abandoned.

[30] Foreign Application Priority Data

Oct. 17, 1979 [JP] Japan ............................. 54-132827

[51] Int. Cl.$^4$ ............................................. G06F 3/16
[52] U.S. Cl. ................................... 364/710; 364/709; 364/900; 381/51
[58] Field of Search ............ 364/709, 710, 715, 200, 364/900; 381/51

[56] References Cited

U.S. PATENT DOCUMENTS

| | | | |
|---|---|---|---|
| 4,090,247 | 5/1978 | Martin | 364/709 |
| 4,117,542 | 9/1978 | Klausner et al. | 364/900 |
| 4,158,231 | 6/1979 | Olander, Jr. et al. | 364/710 |
| 4,177,520 | 12/1979 | Meff | 364/710 |
| 4,179,584 | 12/1979 | Tanimoto et al. | 381/51 |
| 4,185,169 | 1/1980 | Tanimoto et al. | 364/710 |
| 4,215,240 | 7/1980 | Ostrowski | 381/51 |
| 4,279,021 | 7/1981 | See et al. | 364/709 |
| 4,282,404 | 8/1981 | Tanimoto et al. | 364/710 |

*Primary Examiner*—Gary Chin
*Attorney, Agent, or Firm*—Fitzpatrick, Cella, Harper & Scinto

[57] ABSTRACT

An electronic computer capable of uttering voice is disclosed. The computer has a function to store therein data put in by the operator and the results of operations and automatically read out the stored data sequentially in the order to input step for checking. The computer further includes an instruction key for returning the step back to any desired step when the operator wishes to do so. After the step back by the instruction key, reading of the stored data is repeated starting from the returned step.

7 Claims, 3 Drawing Figures

ELECTRONIC COMPUTER WITH AURAL OUTPUT

This application is a continuation of application Ser. No. 639,622 filed Aug. 9, 1984, now abandoned; which is a continuation of U.S. patent application Ser. No. 442,902, filed Nov. 19, 1982, now abandoned; which is a continuation of U.S. patent application Ser. No. 197,592, filed Oct. 16, 1980, now abandoned.

BACKGROUND OF THE INVENTION

1. Field of the Invention

The present invention relates to an electronic computer with aural output which is able to issue the output of numeral data or operation instructions in the form of a voice.

2. Description of the Prior Art

The type of computer mentioned above is already known in the art. These computers uttering a voice can be used for various purposes. After completing the input of all of data into the computer, the operator can make the computer read out the data from it in a voice to check the input data with reference to the original data or to transcribe the results of operations being read out with a voice onto an account book etc. In reading it often occurs that the operator fails to hear the vocal output or he wishes to hear it once more for the sake of confirmation. However, the phonic computers hitherto known lack such aural output repeating function.

SUMMARY OF THE INVENTION

Accordingly, it is an object of the invention to provide an electronic computer which is improved in repeating performance of an aural output.

It is a more specific object of the invention to provide an electronic computer which is able to automatically read out voice input data and results of operations once stored in the computer and sequentially, in the order of input, step for checking and which further comprises an instruction key with which, when necessary, the operator can return the reading to a desired preceding step to repeat the reading from the preceding step.

Other and further objects, features and advantages of the invention will appear more fully from the following description taken in connection with the accompanying drawings.

DESCRIPTION OF THE PREFERRED EMBODIMENTS

Figure 1:
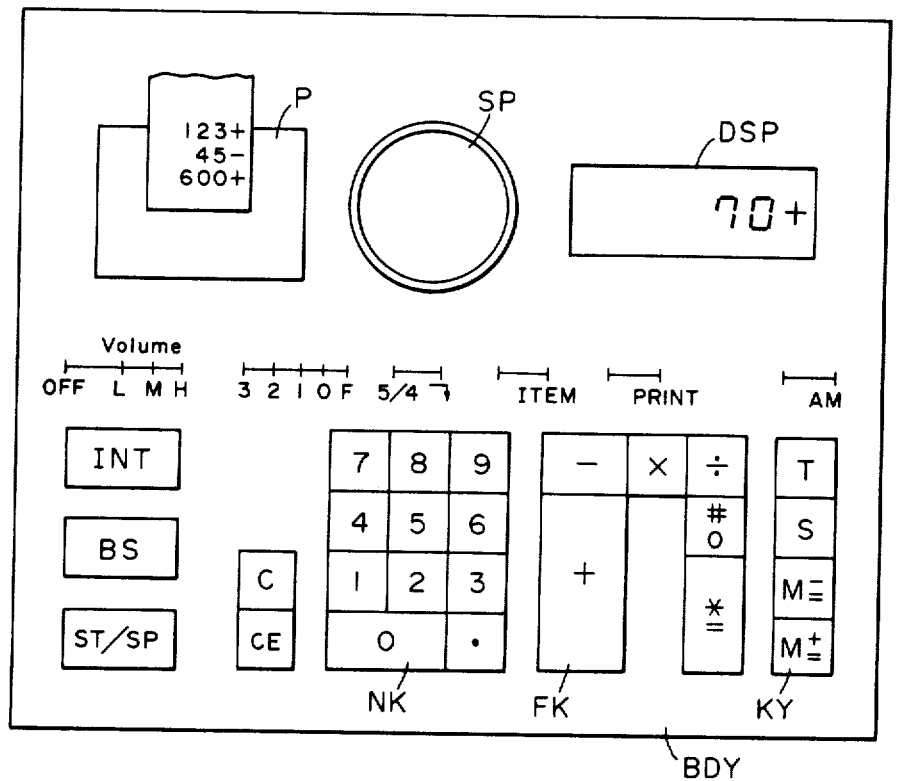
FIG. 1 is a schematic view of a phonic table computer showing an embodiment of the present invention.

Referring first to FIG. 1 showing an example of a voice producing table computer in which the present invention is embodied, the body of the table computer is designated by BDY. DSP is a display device mounted in the computer, SP is a speaker for vocal output, P is a printer for printing output and KY generally designates a group of key switches. The key switch group DY includes in particular a check initial key INT, back step key BS and start/stop key ST/SP. Functions of these keys will be described later in detail. NK generally designates a group of numeral keys and FK is a group of function keys such as $\boxed{+}, \boxed{-}, \boxed{\times}, \boxed{\div}, \boxed{=}$, etc.

Figure 2:
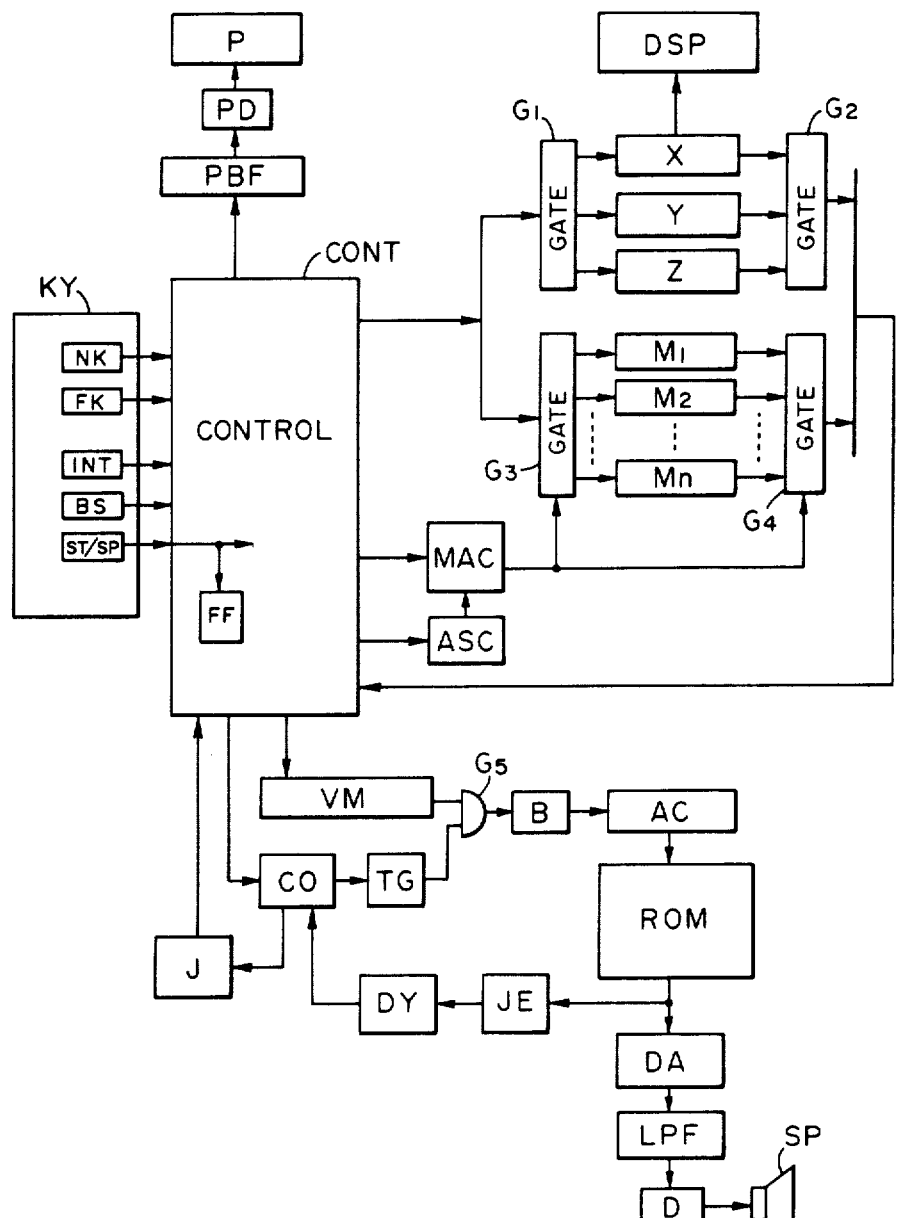
FIG. 2 shows a form of circuit used in the illustrated embodiment.

FIG. 2 is a circuit diagram showing a concrete form of the composition of the table computer shown in FIG. 1.

In FIG. 2, X, Y and Z are operation working registers. As a general rule the content of X register is displayed on the display device DSP. $M_1, M_2 \ldots M_n$ are memory registers the number of which is optional. In the illustrated embodiment, the number of memory registers provided in the circuit is n. $G_1, G_2, G_3$ and $G_4$ are gates for switching over the input and output of data to and from the above working registers X, Y, Z and memory registers $M_1$-$M_n$. Various necessary controls including that of the gates are executed by a control circuit CONT in accordance with the instruction given by the key switches.

FF is a flip-flop for issuing a reading start instruction and a reading stop instruction in accordance with the operation of ST/SP key. MAC is a memory address counter, ASC is a count adder/subtracter, PBF is a print buffer and PD is a printer driving circuit. Among the memory registers $M_1, M_2 \ldots M_n$, a certain particular memory register $M_m$ is appointed by the memory address counter MAC. The content in the memory address counter is added or subtracted one by one by the adder/subtracter ASC. Data edited in a form as required are transferred to the print buffer PBF from the control CONT and then printed by the printer P through the printer driver PD.

VM is a register for storing the content of the particular memory register $M_m$ provisionally prior to vocal output thereof. A portion of the content in VM is stored in a buffer register B through gate $G_5$. CO is a counter for counting the number of words corresponding to the number of effective digits to be put out in voice. The number of desired words, that is, the number of effective digits is preset by CONT. The content of CO changes one by one in response to vocal output of every word. In accordance with the content then present, a timing signal is formed by a timing signal generator TG. To make data in any desired digit of the provisional memory register VM put into the buffer register B, the timing signal is applied to the gate $G_5$. For example, when the content of the counter CO is "1", data stored in the first digit of the register VM is transferred to the buffer register B. The buffer register B stores therein binary codes corresponding to the words to be put out in voice and a read-only memory ROM stores the corresponding voice digital codes.

AC is an address counter for making access to ROM. To produce the sound of words such as "zero", "one" and "plus" as vocal outputs, the counted content in address counter AC is sequentially set at the initial address of the memory ROM in which the codes of these words have been stored, and at the memory ROM the corresponding ROM codes are put out from the set addresses sequentially.

JE is an end code detector for detecting the output of an end code from the memory ROM. The end code has been stored at the final step of ROM of every word. After the detection of the end code, access to the next word is allowed. However, access to the next word can not be started immediately after the detection of the end code by the detector JE because of the interposition of a delay circuit DY. Namely, the output from JE is passed to the delay circuit so as to set a suitable time interval between one word and the next word. The above mentioned counter CO is counted with the output from this delay circuit DY.

DA is a digital-analogue converter which the output into analogue output and then applies the latter to a driver D through a low-pass filter LPF. The driver drives the speaker SP with the output. The speaker SP gives the output word from the ROM in the form of a vocal sound wave. J is a judging circuit for detecting the particular content of the counter CO.

With the above arrangement, when an ordinary accounting is carried out in the table computer, data are processed in working registers X, Y, Z in accordance with the instructions given by the numeral key group NK and function key group FK. The result of operation is displayed on the display device DSP and also printed by the printer P.

Now, the manner of checking will be described hereinafter.

For this purpose, the operator at first operates the checking initial key INT. By this operation of the initial key the content of memory address counter MAC is set to the initial "1" by CONT so as to appoint $M_1$ among the memory registers $M_1, M_2, \ldots, M_n$. Subsequently, data and functions optionally operated are stored in the memory registers $M_1, M_2, \ldots, M_n$ sequentially.

For the purpose of explanation, it is assumed that data stored in one line memory register Mi ($i=1, 2, 3, \ldots, n$) is a combination of a numerical value and one function in a set of digits, and that this one combination constitutes one step. The following table, Table 1, shows an example thereof in which data "123+" is stored in the first memory register $M_1$:

TABLE 1

| MAC content | memory register | data stored |
|---|---|---|
| 1 | $M_1$ | 123+ |
| 2 | $M_2$ | 45− |
| 3 | $M_3$ | 600+ |
| . | . | . |
| . | . | . |
| . | . | . |
| m | $M_m$ | 70+ |
| . | . | . |
| . | . | . |
| . | . | . |
| n | $M_n$ | 890* |

More particularly, a numerical value put in by the operation of numeral keys NK is provisionally stored in one of the working registers, for example, in X and then, when a function key FK such as $\boxed{+}$ key is operated, the numerical value previously stored in the register X and a binary code corresponding to the operated function key are combined to form a combination constituting one step. The combined data in one step is stored in the memory register $M_1$ appointed by memory address counter MAC. In this manner, keyed-in inputs are stored in the memory registers $M_1, M_2, \ldots, M_n$ sequentially. To advance the step sequentially during operation of the computer, the memory address counter MAC is counted up one by one every time that function key is operated after the input of a numerical value. Also during operation of the computer, various operations instructed by the function keys are executed by the control circuit CONT in a manner similar to the case of general accounting.

In the illustrated example, an interim result of operations is displayed on the display DSP, and numeral data and a function symbol are printed by the printer P. Furthermore, as seen from Table 1, when the $\boxed{\ast}$ key is operated at the n-th step there are carried out display and printing of the result of operations. The numerical value resulted from the operations is stored in the memory register $M_n$ together with the code of the $\boxed{\ast}$ key. In other words, when the key for reading out the result of operation such as the $\boxed{\ast}$ key is operated, only the data of the result of operation is stored without any data input by numeral key NK.

After all of the operations necessary for desired arithmetic operations have been completed in this manner, the operator makes the computer start reading from the first step to verify the operations. To this end, the operator operates at first the initial key INT. By this operation of the initial key, the memory address counter MAC is returned to "1" to start reading with the first memory register $M_1$. Then, the operator operates the start/stop key ST/SP to set the flip-flop FF. Thus, reading is started. In accordance with the reading start instruction the memory address counter MAC appoints a memory register for reading (in this case, $M_1$ is appointed first. The content in the appointed memory register is transferred into the register VM and provisionally stored therein. The stored content is then transferred to the buffer register B through gate $G_5$ in a word-by-word fashion in synchronism with the timing signal issued from the timing signal generator TG. By the binary code of this buffer register B an initial address is set at the address counter AC. In accordance with the appointed initial address, voice digital codes are put out sequentially from the memory ROM. These voice digital codes are put out from the computer as vocal outputs after passing through the digital-analogue converter DA, low-pass filter LPF, driver D and speaker SP. In this manner, with the operation of the ST/SP key, the contents provisionally stored in the register VM is put out as a voice in word-by-word fashion and one step comes to end.

The register VM has a plural number of digits. When vocal output is to be made only for the number of effective digits thereof, this can be realized by employing the following method:

During the time when the input data and results of operations are being stored sequentially in the memory registers $M_1, M_2, \ldots, M_n$ in the manner described above, the number of effective digits is counted for every memory register and the counted number is binary coded. This binary coded information of the number of effective digits is preliminarily stored in a particularly determined digit of every memory register Mi. At the time of reading after that, the preliminarily stored code indicative of the number of effective digits is preset in the counter CO by the control CONT. The count of this counter CO is counted down one by one every time when the content in the register VM is transferred to the buffer memory B word by word. When the content of the counter reaches a particularly determined value (for example "0"), this is regarded as a signal indicating the completion of the vocal output from VM, that is, the completion of one step of vocal output composed of two or more words. Thus, judgement can be achieved as to the end point of one step of reading. The judging circuit J previously mentioned serves to detect the appearance of such particularly determined value at the counter CO. In accordance with the judgement made by the judging circuit J, the control CONT makes the content of the memory address counter MAC step up by +1 and the content of the next memory register $M_2$ is transferred to the register VM. Now, the vocal output of the second step is effected in the same manner as above.

In the manner described above, after reading for a check has once been started by the ST/SP key, contents stored in memories $M_1, M_2, \ldots, M_n$ are automatically and sequentially transferred to the register VM and then put out from the computer as voice in the order of $M_1, M_2, \ldots, M_n$. The operator can check the input data while hearing the voice output to find out any input error with reference to the original data or he can conduct transcription while hearing the result of operation which the computer produces.

In checking, if the operator failed to hear any word of the vocal outputs or if he wishes to hear the reading again confirm the data he can return to the step of reading to the previous step by operating the back step key BS. In accordance with the instruction by the back step Key BS, the content of the memory address counter MAC is counted down by 1 by the count adder/subtracter ASC and the memory register Mi at one preceding step is appointed for reading. According to the same procedure as above, the content of the reappointed memory register is transferred to the register VM and then again put out as a voice. In this manner, the reading can be stepped back step by step up to any desired step by repeating the operation of BS key, one operation of which brings the reading back one step. After step back, reading begins with the desired step and proceeds sequentially in the same manner as in the previous reading. Thus, the operator can hear the same reading of any desired step repeatedly for the purpose of confirmation.

The operator can operate the back step key BS at any time point during reading. The operation of BS key may be done in the middle of a word in one step now being read out, after the completion of vocal production of the word or after the completion of vocal production of all the words contained in one step. Also, the operator can operate the start/stop key ST/SP in the course of reading to stop the reading for a while.

The manner of control of the above described operations of the computer will be described hereinafter with reference to the flow chart shown in FIG. 3.

For reading, the flip-flop FF is inverted by the key ST/SP after the operation of the key INT. As an example, it is assumed that before the operation of key ST/SP the flip-flop FF is in its reset position "0". Under the condition of FF="0", an operation of ST/SP key will set the flip-flop FF to "1" and thereby a reading start instruction will be issued. On the contrary, in case that FF="1", and operation of ST/SP key will reset the flip-flop to "0" and thereby a reading stop instruction will be issued.

When a reading start instruction is issued by the ST/SP key in this manner, the content of a memory appointed by the memory address counter MAC is transferred to the register VM at first under the control of CONT as previously described (Mi→VM). The binary code indicative of the number of effective digits preliminarily stored in a certain particular digit of the memory is transferred to the counter CO through the control circuit CONT (NUMBER OF EFFECTIVE DIGITS→CO).

The content of the counter CO is counted down one by one when vocal output is made word by word. This count-down is continued until the content of CO becomes zero, namely until the judgement on (CO=0?) becomes Yes. When Yes, it indicates the completion of one step of vocal output. In this position, the memory address counter MAC is advanced one step (MAC+1) to appoint the next address of memory register Mi. At the same time, processing of (Mi→VM) is executed and then the cycle described above is repeated. This cycle of operation is repeated for all of $M_1, M_2, \ldots, M_n$ and when Mi=0 output from all the memories are completed. Thus, reading comes to end.

Figure 3:
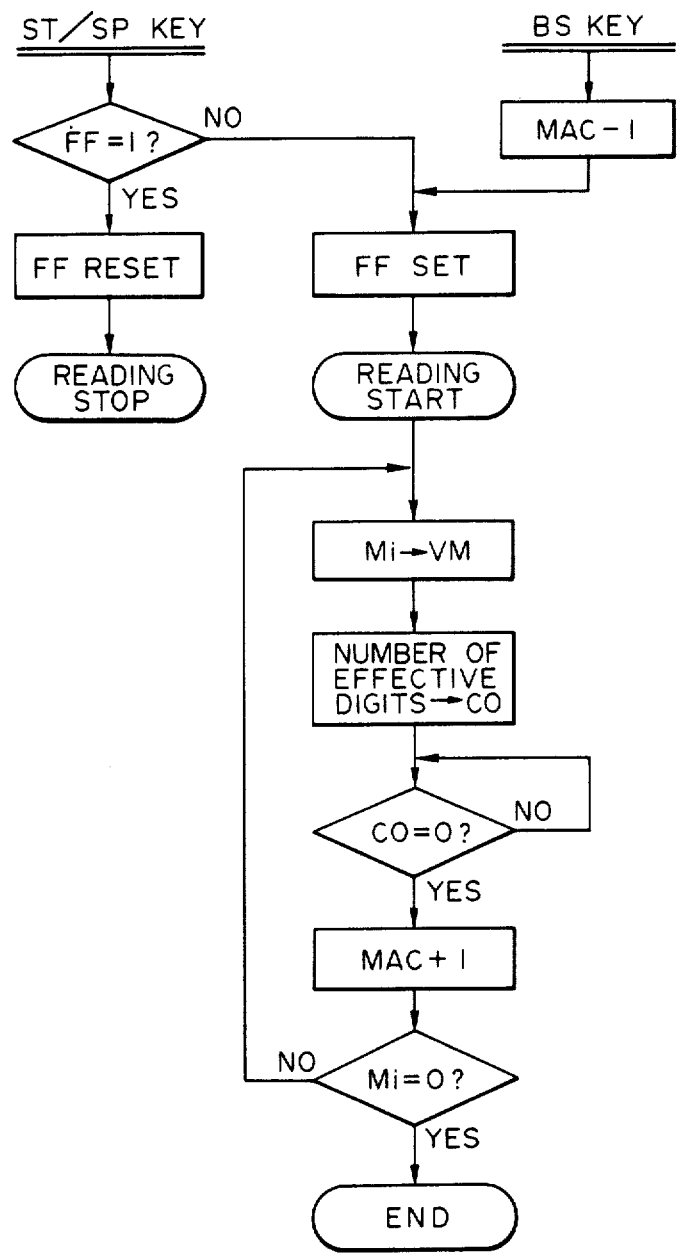
FIG. 3 is a flow chart illustrating the manner of operation and control of keys related to checking and reading.

In the flow chart shown in FIG. 3, when the back step key BS is operated, the memory address counter MAC is stepped back by one as previously described (MAC−1). Thereafter, the same cycle of reading as in the case of the above reading start control is repeated. As previously described in detail, as a result of operation of back step key BS, reading is once more performed starting with the step immediately before the step of which reading is going. By operating the key BS a plural number of times, the operator can make the reading stepped back a plural number of steps corresponding to the number of times of operation of the back step key BS. Therefore, reading can be restarted with any desired step.

As well understood from the foregoing, the computer producing a voice output according to the invention has many advantages. A series of data once put in as well as the results of operations thereof can be read out sequentially and all at once in once course of reading. This is very convenient to the operator who conducts checking. In addition, an operator may stop the reading for a while in mid-course of the reading or to step back to any desired step with which the operator wishes again to start hearing. Therefore, according to the invention, the operator can easily make a confirmation of data which he once failed to hear or transcribe.

While the invention has been particularly shown and described with reference to preferred embodiments thereof, it will be understood by those skilled in the art that the foregoing and other changes in form and details can be made therein without departing from the spirit and scope of the invention.

What I claim is:

1. An electronic apparatus for producing a voice output comprising:
    a first manually operable key;
    a second manually operable key;
    data memory means for storing data;
    voice memory means for storing voice information corresponding to said data stored in said data memory means for providing a voice output from said apparatus;
    address menas for addressing said data memory means to read out data stored therein;
    first control means connected to and responsive to actuation of said first manually operable key for controlling said address means to address said data memory means in a first order to read out said data therefrom and for controlling the reading out of said voice information from said voice memory means in accordance with said data read out from said data memory means; and
    second control means connected to and responsive to actuation of said second manually operable key upon stopping of the operation of said address means by said first control means for controlling said address means to step back the address of said data memory means addressed in the first order to a stepped-back address preceding the last address addressed by said address means and for thereby repeating the reading out of said voice information automatically from said voice memory means in accordance with the data read out from said data memory means beginning with said stepped-back address which becomes a start address for reading out data in the first order from said data memory means.

2. An electronic apparatus according to claim 1, wherein said data memory means comprises a read-write memory.

3. An electronic apparatus according to claim 1, further comprising input means for entering said data into said apparatus to be stored in said memory means.

4. An electronic apparatus according to claim 1, further comprising converting means for converting said voice information read out from said voice information memory means to analog voice information.

5. An electronic apparatus for producing a voice output comprising:
manually operable input means having first and second keys;
data memory means for storing data;
voice memory means for storing voice information corresponding to said data stored in said data memory means for providing a voice output from said apparatus;
address means for addressing said data memory means to read out data stored therein;
first control means responsive to actuation of said first key for controlling said address means to address said data memory means in a first order and for controlling the reading out of said voice information corresponding to said data from said voice memory means in accordance with said data read out from said data memory means; and
second control means connected to said second key of said manually operable input means for controlling said address means upon the stopping of operation of said first control means to step back the address of said data memory means addressed in said first order to a stepped-back address preceding the last address addressed by said address means and for repeating the reading out of said voice information automatically, corresponding to said data read out, from said voice memory means in accordance with said data so read out by causing said first control means to start reading out from the stepped-back address which becomes a start address for reading out data in the first order from said data memory means.

6. An electronic apparatus according to claim 5, further comprising input means for entering data into said apparatus to be stored into said memory means.

7. An electronic apparatus for producing a voice output comprising:
input means comprising data input means for entering data, first instruction means for entering first instructions and second instruction means for entering second instructions; said data, said first instructions, and said second instructions comprising general information;
data memory means for storing the general information entered by said input means;
voice memory means for storing voice information corresponding to the general information stored in said data memory means for providing a voice output from said apparatus;
address means responsive to first instructions entered by said first instruction means for generating an address for addressing said data memory means read out general information stored therein;
first control means for controlling said address menas to address said data memory means to read out sequentially said general information therefrom and for controlling the reading out of said voice information corresponding to said general information from said voice memory means in accordance with said general information read out from said data memory means; and
second control means responsive to second instructions entered by said second instruction means, upon stopping of the operation of said address means in response to said first instructions for controlling said address means to step back the address of said data memory means to a step-back address preceding the last address addressed by said address means and then for repeating reading out said voice information automatically from said voice memory means in accordance with general information sequentially read out from said data memory means beginning with said stepped-back address which becomes a start address for reading out general information from said memory means.

* * * * *